Jan. 30, 1940.  J. B. McCUE  2,188,840
HORIZONTAL ROTARY FILTER
Filed May 13, 1938    3 Sheets-Sheet 3
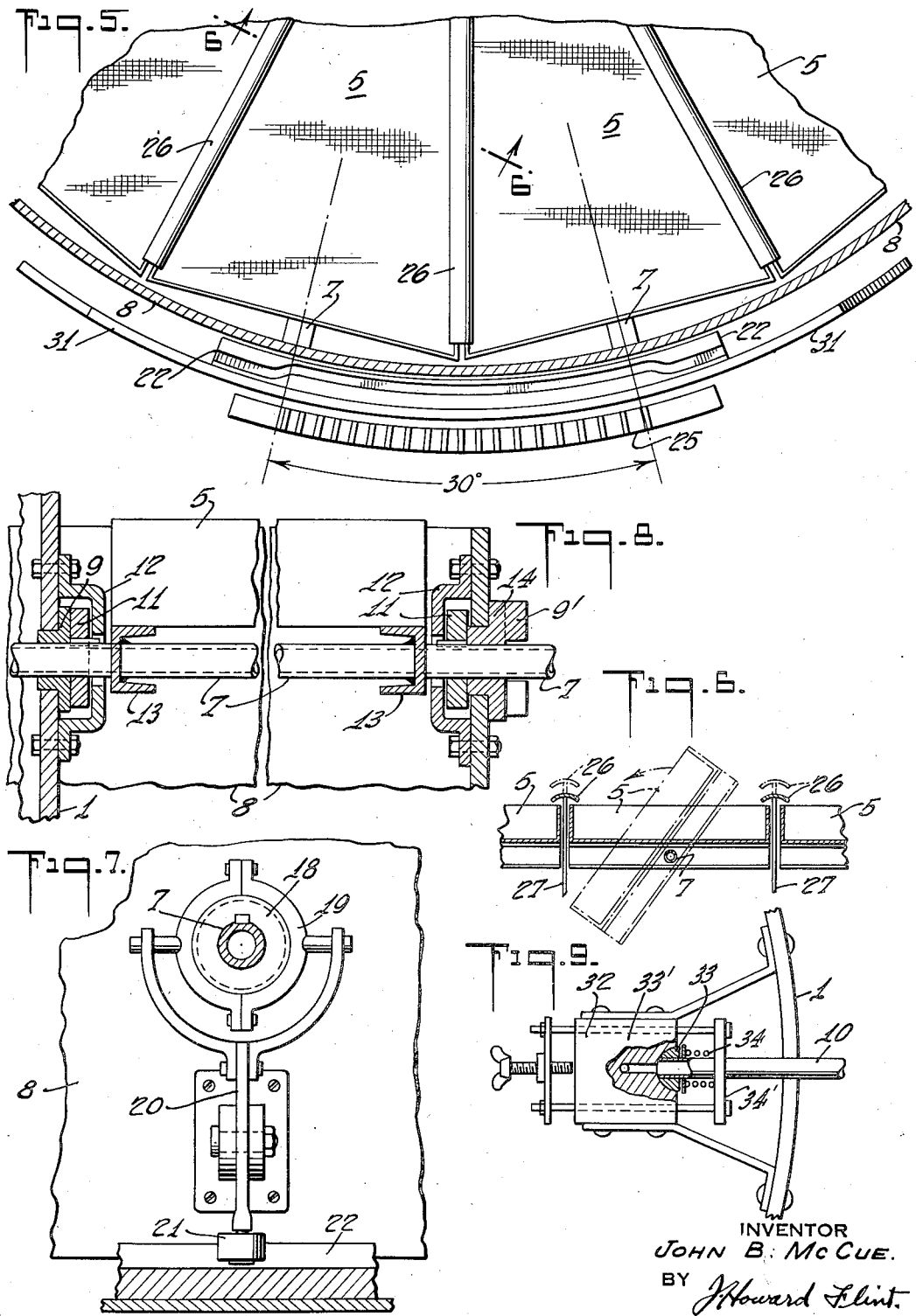
INVENTOR
JOHN B. McCUE.
BY J. Howard Flint
ATTORNEY Patented Jan. 30, 1940

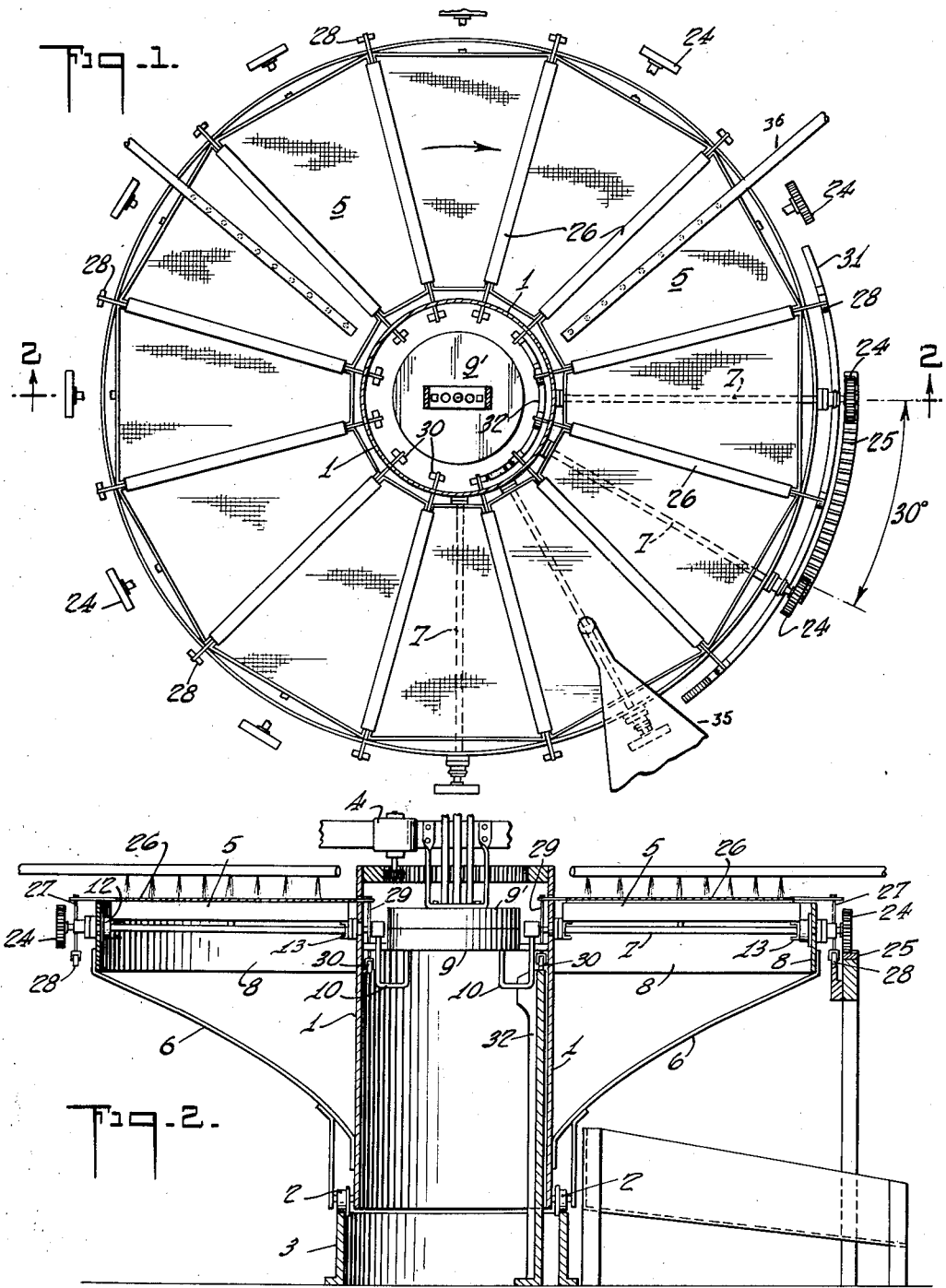

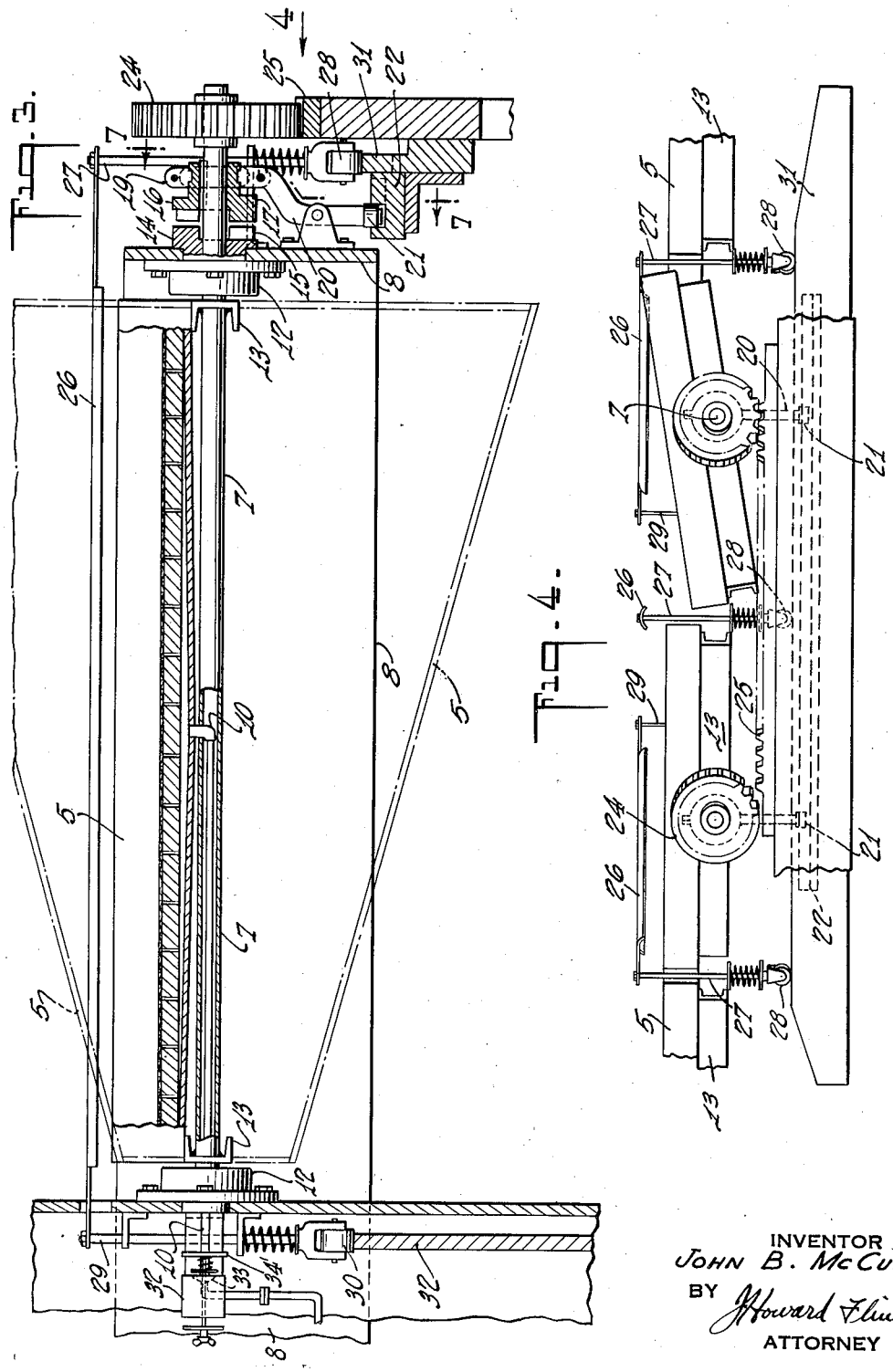

2,188,840

UNITED STATES PATENT OFFICE 2,188,840

HORIZONTAL ROTARY FILTER

John B. McCue, Morgantown, W. Va.

Application May 13, 1938, Serial No. 207,651

4 Claims. (Cl. 210—196)

This invention pertains to improvements in filters of an horizontal rotary type in which are separate filter compartments, and pertains particularly to means for attaining both rigidity of structure and diversity of action, with attendant improvement of filtration efficiency.

Filters that immerse the completed filter cake in liquid are capable of exceedingly high efficiency. With them, leaching and washing are substantially uniform over the entire filter cake. Displacement of solution from the cake by immersion in wash liquid is accomplished with a minimum of liquid. In horizontal rotary filters having separate compartments, individual filter cakes may be immersed under successive-layers of liquid and so be washed with high efficiency, such as is desirable where precious liquids are recovered or where wash liquid is expensive. Such filters utilizing a cyclic succession are adapted for high capacity combined with accurate control of filter liquids.

In the structure of previous horizontal filters, sometimes there has been lack of rigidity, or else the structure has been cumbersome. Horizontal filters also have lacked adaptability to varying types of sludge to be filtered.

An object of this invention is to provide an horizontal rotary filter that is adapted to promote filtration during substantially all of the period of rotation, but is both light and rigid. Such a filter is to utilize a maximum of possible filter area, and discharge the cake quickly. One of the important objects of this invention is to provide for rapid and positive discharge of filtrate and of filter cake from the individual compartments. Also an important object is to provide improved supporting and operating structure for the individual compartments, structure to be clean in operation, simple in construction, and strong under stress of rapid discharge of filter cake. These, and the further object of simple disposal of filtrate, will be apparent further in the following illustrative description of this invention, taken with the accompanying drawings, and particularly pointed out in the appended claims.

In the drawings, illustrative of one form of this invention:

Fig. 1 represents a diagrammatic plan view of an horizontal rotary filter embodying the present improvements;

Fig. 2 represents a central vertical section of the filter along the line 2—2 of Fig. 1;

Fig. 3 is a vertical section through one of several individual filter segments, together with certain of the operating mechanism for the filter segment;

Fig. 4 is a diagrammatic end elevation of certain of the operating mechanism as indicated in Fig. 3;

Fig. 5 illustrates in diagrammatic plan view an arrangement of cam tracks and of gear rack for dumping individual filter segments;

Fig. 6 is a vertical section through a plurality of filter segments, as along the line 6—6 of Fig. 5, to illustrate the position of sealing elements and the travel of a filter segment during discharge of filter cake; and Fig. 7 is an end elevation of locking mechanism for a filter segment, viewed from the section 7—7 of Fig. 3;

Fig. 8 is a detail section of means of mounting a filter bed and supporting shaft; and Fig. 9 is a plan view of a sliding joint to conduct fluid to or from individual filter segments.

Objects of this invention are attained in a preferred embodiment in which individual filters are secured on individual rotatable shafts that are adapted to conduct fluids to and from the filter and adapted also to operate control means for clearing each filter segment.

Reference is made more particularly to the drawings, which describe a preferred arrangement of this invention, though the invention may be practiced in other forms within the scope of the appended claims. This invention is associated with a series of horizontal filters mounted on a central vertical support 1. This support comprises a cylinder rotatably placed upon wheels 2 and circular track 3. The filter is rotated by motor 4, which for illustration is shown connected by gears or other means to the upper part of support 3; but motor 4 may be otherwise mounted or connected. Suitable pulp inlet 35 and wash liquid conduits 36 are mounted about the filter as a whole. Individual filter pans 5 are mounted as segments upon the outer side of support 1. Each filter pan 5 is secured rigidly upon a rotatable shaft 7 which is journalled between inner support 1 and an outer rim 8, as shown in Figs. 2 and 3. The weight of outer rim 8 is supported at the bottom of cylinder 1 through braces 6. Individual filter segments 5 are mounted closely together to obtain maximum filtering surface. They are dumped and cleaned successively and quickly by co-operating elements preferably arranged and operated in an embodiment of this invention to be described.

In this type of filter there is embodied, as illustrated in Figs. 3 and 8, a hollow shaft 7 for each segment, journalled horizontally between central support 1 and outer rim 8. Upon this shaft the individual filter compartment 5 is mounted rigidly, by cross-beams, as by channel beams 13, through which shaft 7 is welded or keyed. Shaft 7 extends through an inner bearing 9 in support 1 and an outer bearing 9' in rim 8. Against the opposed faces of these bearings, collars 11 are keyed to shaft 7, and these in turn are enclosed in flanges 12 which are fastened respectively within inner support 1 and outer rim 8. Thus the collars, and hence shaft 7, are held as between spacer elements, against endwise play.

From each filter bed, a fluid conduit 10 is fitted to extend through shaft 7 to within central cylindrical support 1, as shown in Fig. 3. Inside of support 1, each conduit 10 is fitted with a sliding rotatable joint 32, so that conduit 10 is operative to convey fluid in any rotative position of the individual filter and of shaft 7. Such joint 32 is illustrated in detail in Fig. 9, which shows conduit 10 extending through a ball and socket joint in which co-operating male and female elements 33 and 33' are held in engagement by a spring 34. Spring 34 is compressed between plates which loosely encircle conduit 10, the inner plate 34' being rigidly secured to female member 33' so as to maintain tight contact within the sliding joint 32. If desired, the member 34' may be made adjustable to alter the force of spring 34.

Inside of central supporting structure 1 is secured a rotary control valve 9, such as a two-disked valve of the so-called Portland type, as illustrated in Fig. 1. This comprises a pair of disks provided with a plurality of cooperative ports, so that with one disk 9' held stationary, the other, a movable disk 9, in sequence brings various combinations of conduits into operation. In the form shown, this valve is placed horizontally from an overhead support, with the movable disk 9 fastened to the walls of rotatable vertical support 1. This achieves compactness and balance of load about hollow shaft 7. To movable supported disk 9, conduits 10 with sliding joints 32 are connected, so that in selected positions of central support 1 and of rotatable filters 5, a given filter may be under vacuum, as for withdrawal of filtrate, or may be under pressure as for discharge of filter cake.

Shafts 7 further enter into the operation of filter beds 5 in controlling means to rotate the beds for discharge of filter cake. To this end, shafts 7 overhang outer rim 8, to co-act with locking and dumping mechanism to be described.

As shown in Fig. 3, shafts 7 at their outer end carry a gear wheel 24, which engages a gear rack 25. This is operative during a selected arc of travel of the entire filter, as shown in Fig. 5. Thus, as shaft 7 is carried in an horizontal plane, it is rotated to permit filter cake to fall from the filter, as illustrated in Fig. 6. During this period, shaft 7 through its contained conduit 10 may serve to convey air or steam against the filter bed, even in a pulsating stream if valve 9 be so adjusted, to facilitate discharge and cleaning of the filter during a selected brief period of rotation of shaft 7.

However, in the form shown, before each pan 5 can rotate with its shaft 7, a guard or lock 26, which overlaps and rests closely to adjacent edges of contiguous pans, must be removed. To effect this operation, the arrangement shown in Fig. 4 is embodied in the preferred structure. It is evident from the drawings that the individual filter pans 5 are mounted as closely together as will permit their rotation, to obtain maximum filter area as well as rigidity of structure. Adjacent edges are overlapped by the arcuate guard elements 26 which are supported by pairs of vertical rods 27, 29, as shown in Fig. 3. One of the rods, 27, is mounted outside of outer rim 8 upon a roller 28, while an inner rod, 29, is mounted inside of central support 1 upon a roller 30. These rods rise through guide plates fastened respectively to rim 8 and to support 1, and co-act with springs compressed under the guide plates so as normally tending to move guard 26 down tight over the pan edges. To operate these guards so that the pans may rotate, there are provided an exterior cam track 31 and a concentric inner cam track 32. For an appropriate arc of travel of the filter, these tracks are curved upwardly so as to lift each guard 26 just before the shaft 7 is rotated. Unless guard 26 is raised sufficiently to permit rotation of the filter compartment, shaft 7 and filter 5 cannot rotate to discharge filter cake.

A preferred form of this invention comprises further means to lock each filter 5 in horizontal position, until the period to rotate shaft 7 for discharge of filter cake. This further means comprises a latch or clutch, such for example as shown in Figs. 3 and 7. It is borne by each shaft 7, and comprises a pair of dogs 16, 17 mounted on a collar 18 about shaft 7. Collar 18 is keyed to slide along shaft 7, and when near its inner position pushes dogs 16, 17 into locking engagement with a complemental pair of dogs 14, 15 which are fixed to rim 8. To disengage these dogs, collar 18 is pulled out by means of a yoked lever 20, which is pivoted to rim 8 with its lower end actuated by a cam 22. As shown, this actuation is effected by a roller 21 secured to the lower end of lever 20, and a guide groove 22 supported for an arc of the filter travel generally parallel to gear rack 25. Near the entrance and the exit, guide groove 22 is positioned inwardly toward the filter by sharp curves, as shown in Fig. 5, in such way as to cause dogs 16, 17 to move out and unlatch quickly just before shaft 7 is to be rotated by rack 25, and to latch quickly just after shaft 7 has completed its revolution.

In order to facilitate the initial rotational movement of shaft 7 and a loaded filter segment 5, the turning torque against rack 25 at the outset may be minimized by weighting one side of filter segment 5 more than the other. This may be accomplished by mounting filter pan 5 slightly off center on shaft 7, so that the load of filter cake may assist in causing pan 5 to start to rotate by gravity just before rack 25 engages.

For operation, it will be observed from Figs. 4 and 5 that as the filter as a whole rotates, cam track 31 first comes into play to raise sealing guards 26 so that corresponding filter segment 5 can be rotated with its shaft 7. By the time seal 26 is raised out of the way, clutch roller 21 has entered its groove 22 so as to unlatch the locking dogs quickly. As soon as pan 5 thus is free to turn, gear wheel 24 is in position to engage rack 25 and thus to rotate pan 5 with shaft 7. This gear is selected to turn pan 5 a complete revolution during such travel of the filter as is best fitted to the work at hand, as for example while the filter travels an arc of about 30°. It is evident that this arrangement lends itself readily to change of gear ratio, or arc of revolution for dumping, by change of elevation of rack 25 and change of diameter of gear 24. It may be observed incidentally from Fig. 4 with reference to sealing cam 26 operation, that cam track 31 is provided with a sharper pitch to return a seal guard element 26 than to raise it, inasmuch as there is usually very little liquid when the filter cake is ready for discharge, while after a filter has been cleaned it should quickly be ready to receive an inpouring of new sludge. This requires locking pan 5 quickly to prevent swaying.

In operation, the filter is rotated continuously by motor 4 driving central support 1 upon circular track 3. Individual filter segments are brought successively under a sludge inlet 35 and subsequently under one or more suitable wash liquid inlets 36. During this period, rotary valve 9—9' suitably controls removal of filtrate from appropriate filter segments 5, as by application of vacuum thereto, while the filter cake is immersed in supernatant liquid.

After about 330° of rotation the filter cake is dumped. This is effected by contact of guard element rollers 28 with lifting cams 31 and 32, and by engagement of lever arm 20 with cam 22 to unlock pan 5; followed at once by meshing of rack 25 with dumping gear 24 to rotate pan 5 on shaft 7.

Thus it is evident from the embodiment here illustrated that this invention comprises means extending from a central cylindrical support to assure operation of closely-fitted and inner-related mechanism. Hollow shafts 7 are spaced between the central support and the outer rim so rigidly as to permit leading the filter conduit 10 through this shaft for accurate connection with a rotary valve. Shaft 7 also assures engagement of nicely-fitted cams 21 and 28 for raising the pan guard and for unlocking the filter pan, as well as accurate engagement of the rack and gear for dumping the filter. The relatively large base obtained with the circular central support also contributes to the stability and close engagement of these operative elements.

In accordance with the patent statutes, the principles of this invention have been described by illustration of preferred embodiments and mode of operation; but it will now be apparent to those skilled in this art that the principles thereof may be practiced in other forms than those specifically set forth, within the scope of the appended claims.

I claim:

1. An horizontal rotatable filter comprising a central rotatable support vertically disposed upon a circular track, a circumferential rim spaced therefrom, hollow radial shafts journalled between the central support and between the rim, separate filter beds mounted on the shafts, and fluid conduits leading from the filter beds and mounted within the interior of their respective hollow shafts.

2. An horizontal rotatable filter comprising a central rotatable cylinder vertically disposed upon a circular track, an outer rim rigidly braced to the lower part of the central cylinder, hollow shafts journalled radially between the central cylinder and the outer rim and overhanging the rim, separate filter beds fixed upon the shafts, fluid conduits leading from the filter beds and mounted within the shafts, co-operative clutch members on the rim and on the shaft outside the rim to lock each filter bed and shaft against rotation comprising inter-engaging dogs on the rim and on the shaft, means carried by the shaft to release the clutch members comprising a lever arm to reciprocate the shaft dog, and a cam groove to actuate the lever arm, and a rack and pinion to rotate the shaft and filter bed, guards overlapping the edges of adjacent filter beds and means comprising an elevated cam track to elevate the guards prior to release of the clutch members.

3. An horizontal rotatable filter comprising a central cylindrical support mounted on tracks for rotation, a circumferential rim spaced therefrom, hollow radial shafts journalled between the central support and the rim, separate filter segments mounted on the shafts, means carried by the outer portion of the shafts and a cooperating cam groove to force said means both to latch and unlatch the filter segments and shafts and means operative on the outer portion of the shafts to rotate the filter beds and shafts; fluid conduits extending from the filter beds and mounted within the shafts, and a rotatable valve connected with the fluid conduits and mounted within the central support, for rotation therewith.

4. In an horizontal rotatable filter comprising a central cylinder mounted for rotation upon circular tracks, and a circumferential rim supported in spaced relation therefrom, radial hollow shafts journalled in the central cylinder and in the rim, means to minimize end play of the shaft, filter segments mounted rigidly on the shafts, fluid conduits from the filter segments through the hollow shafts, a multiple port valve mounted within the cylinder for rotation therewith, a rotatable joint connecting the fluid conduits and the valve, the improvement comprising filter bed latch means mounted upon the outer end of the shaft, means to open the latch during a limited arc of rotation of the filter and means comprising a gear element to rotate the shaft during the period the latch is open, the means to open the latch comprising a lever mounted upon the shaft and comprising a cam member and a cam groove to force the lever arm to open and to close the filter bed latch.

JOHN B. McCUE.